(12) United States Patent
Crump et al.

(10) Patent No.: US 10,428,913 B2
(45) Date of Patent: Oct. 1, 2019

(54) ORIFICE FLOW VALVE

(71) Applicant: BorgWarner Inc., Auburn Hills, MI (US)

(72) Inventors: Matthew W. Crump, Cortland, NY (US); Keith B. Cobb, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 64 days.

(21) Appl. No.: 15/113,118

(22) PCT Filed: Jan. 27, 2015

(86) PCT No.: PCT/US2015/013155
§ 371 (c)(1),
(2) Date: Jul. 21, 2016

(87) PCT Pub. No.: WO2015/116606
PCT Pub. Date: Aug. 6, 2015

(65) Prior Publication Data
US 2017/0023107 A1   Jan. 26, 2017

Related U.S. Application Data

(60) Provisional application No. 61/932,506, filed on Jan. 28, 2014.

(51) Int. Cl.
*F16H 7/08* (2006.01)
*F16H 15/00* (2006.01)

(52) U.S. Cl.
CPC ............ *F16H 7/0848* (2013.01); *F16H 7/08* (2013.01); *F16H 15/00* (2013.01);
(Continued)

(58) Field of Classification Search
CPC ............ F16K 15/00; F16H 2007/0806; F16H 2007/0812; F16H 2007/0859; F16H 7/0848; F16H 7/08
(Continued)

(56) References Cited

U.S. PATENT DOCUMENTS 3,903,921 A   9/1975   Brookman
2008/0121834 A1   5/2008   Kern
(Continued)

FOREIGN PATENT DOCUMENTS

CN   102338186 A   2/2012
CN   202833600 U   3/2013
(Continued)

OTHER PUBLICATIONS

International Search Report and Written Opinion; dated May 12, 2015 for International Application No. PCT/US2015/013155; 12 pages.
(Continued)

*Primary Examiner* — P. Macade Nichols
(74) *Attorney, Agent, or Firm* — BrooksGroup

(57) ABSTRACT

A number of variations may include a product comprising: an orifice flow valve comprising: a disk, wherein the disk comprises at least one orifice which is constructed and arranged to direct a forward flow of a fluid through the at least one orifice and to impede a backflow of the fluid through the at least one orifice.

19 Claims, 3 Drawing Sheets

(52) U.S. Cl.
CPC .............. *F16H 2007/0806* (2013.01); *F16H 2007/0812* (2013.01); *F16H 2007/0859* (2013.01)

(58) Field of Classification Search
USPC ...................................... 137/513.3
See application file for complete search history.

(56) References Cited

U.S. PATENT DOCUMENTS

2012/0252616 A1* 10/2012 Tawarada et al. ........ F16H 7/08
474/110
2013/0331214 A1   12/2013 Crump

FOREIGN PATENT DOCUMENTS

| CN | 103133451 A | 6/2013 |
|---|---|---|
| CN | 103343836 A | 10/2013 |
| DE | 19929668 A1 | 1/2001 |
| DE | 102009017484 A1 | 10/2010 |
| JP | 55152981 A | 11/1980 |
| JP | 2002333056 A | 11/2002 |
| JP | 2008133879 A | 6/2008 |
| JP | 2009192030 A | 8/2009 |
| JP | 2009281492 A | 12/2009 |
| JP | 2012062945 A | 3/2012 |
| JP | 2012211645 A | 11/2012 |
| JP | 2013142441 A | 7/2013 |

OTHER PUBLICATIONS

Chinese Office Action dated Mar. 2, 2018 ; Application No. 201580003855.2; Applicant: BorgWarner Inc.; 30 pages.
Japanese Office Action dated Nov. 6, 2018 ; Application No. 2016-544850; Applicant; BorgWarner Inc.; 16 pages.
Chinese Office Action dated Dec. 5, 2018 ; Application No. 201580003855.2; Applicant: BorgWarner Inc.; 17 pages.
Chinese Office Action dated Jun. 3, 2019; Application No. 201580003855.2; Applicant: BorgWarner Inc.; 9 pages.

* cited by examiner

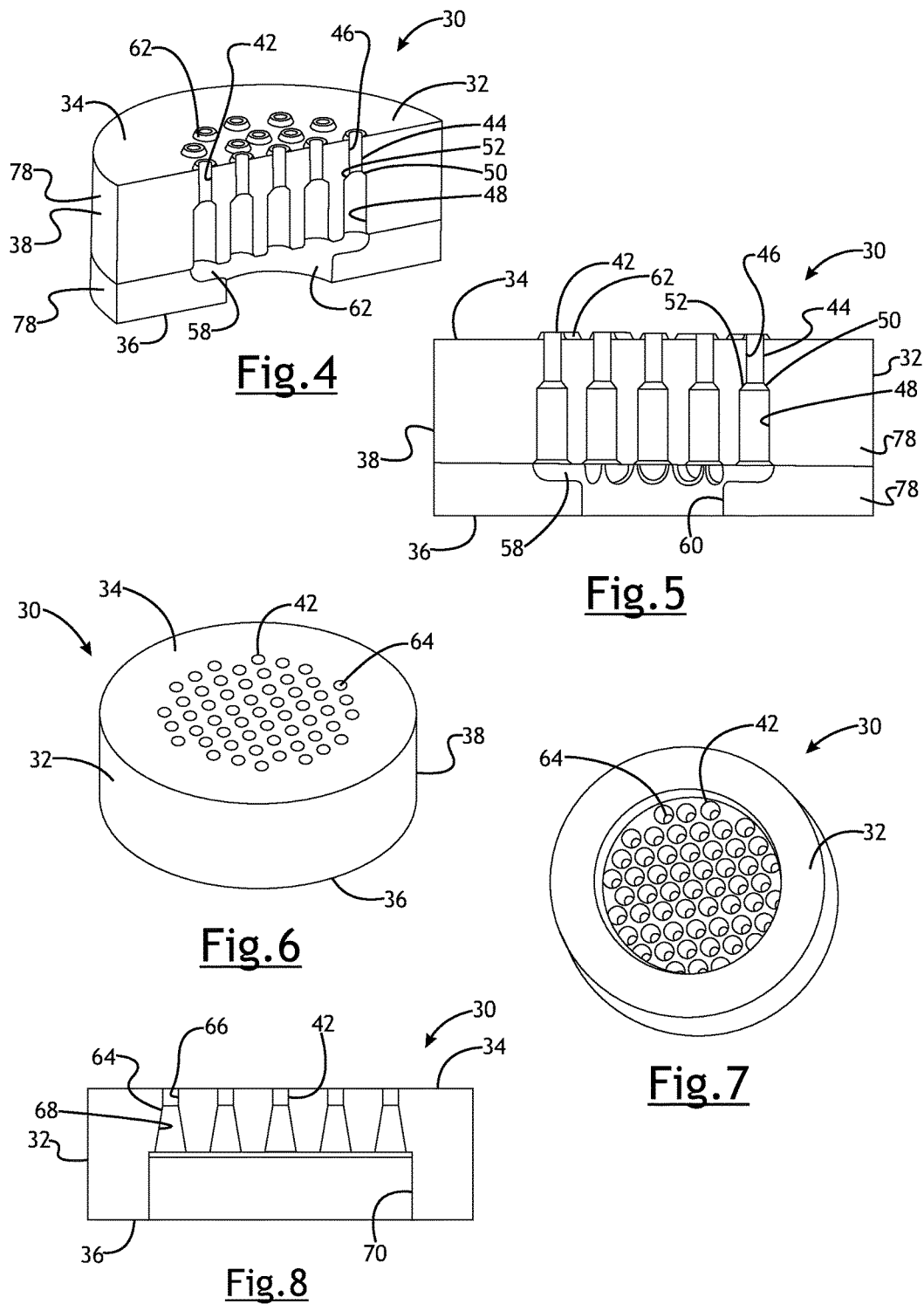

ORIFICE FLOW VALVE

CROSS-REFERENCE TO RELATED APPLICATIONS

This application claims the benefit of U.S. Provisional Application No. 61/932,506 filed Jan. 28, 2014.

TECHNICAL FIELD

The field to which the disclosure generally relates to includes hydraulic tensioners.

BACKGROUND

A vehicle may include one or more hydraulic tensioners.

SUMMARY OF ILLUSTRATIVE VARIATIONS

One variation may include a product comprising: an orifice flow valve comprising: a disk, wherein the disk comprises at least one orifice which is constructed and arranged to direct a forward flow of a fluid through the at least one orifice and to impede a backflow of the fluid through the at least one orifice.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 4 illustrates a partial cut view of an orifice flow valve according to a number of variations.

FIG. 5 illustrates a section view of an orifice flow valve according to a number of variations.

FIG. 6 illustrates a perspective view of an orifice flow valve according to a number of variations.

FIG. 7 illustrates a cut view of an orifice flow valve according to a number of variations.

FIG. 8 illustrates a section view of an orifice flow valve according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
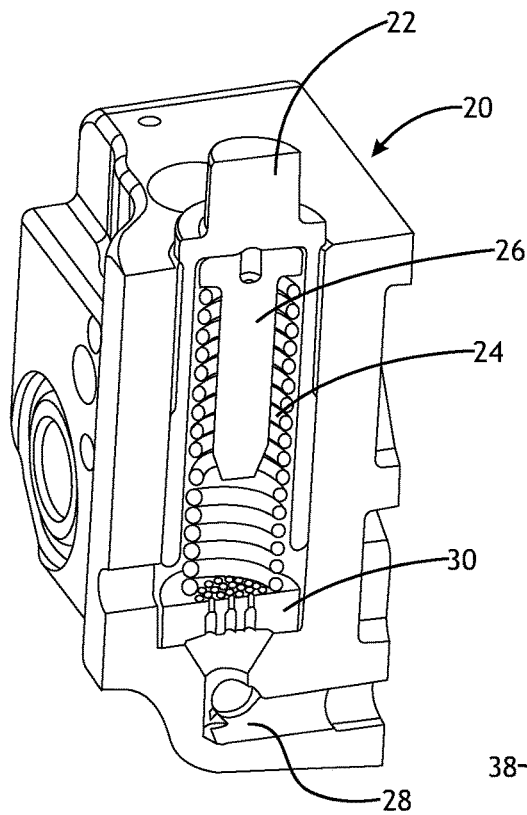
FIG. 1 illustrates a partial cut view of a hydraulic tensioner with an orifice flow valve according to a number of variations.
Figure 2:
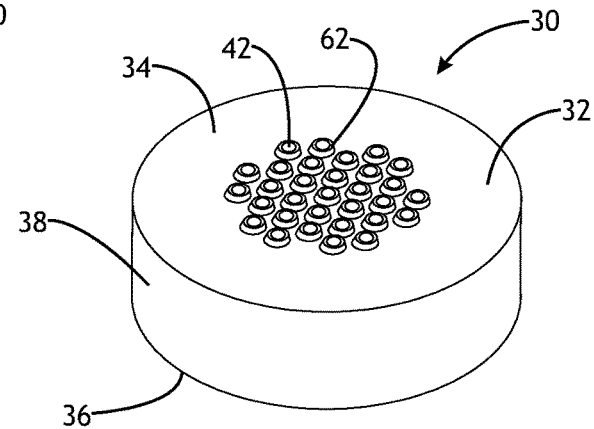
FIG. 2 illustrates a perspective view of an orifice flow valve according to a number of variations.

Referring to FIG. 1, in a number of variations, a hydraulic tensioner 20 may comprise a piston 22, a piston spring 24, a flow valve 30, and shaft 26. In a number of variations, a orifice flow valve 30 may be integrated into the hydraulic tensioner 20, which may eliminate the need for a ball or disk check valve assembly. The use of the orifice flow valve 30 may eliminate or reduce manufacturing issues as well as wear and fatigue issues which may occur with ball or disk check valve assembles. The orifice flow valve 30 may also allow for additional packaging space as it may be smaller than a traditional ball check valve assembly. In a number of variations, the piston 22 may extend which may take up chain slack which may allow oil to flow from the reservoir 28 into the tensioner 20 and may create forward flow. In a number of variations, the forward flow may be directed to the orifice flow valve 30. In a number of variations, the orifice flow valve 30 may be constructed and arranged to direct the forward flow through one or more orifices. In a number of variations, the piston 22 may retract which may cause the pressure in the tensioner 20 to increase which may cause the forward flow back toward the reservoir 28 creating a back flow. In any number of variations, the orifice flow valve 30 may be constructed and arranged to create a rated backflow which may be beneficial in relieving the tensioner pressure and reducing the chain load.

Figure 3:
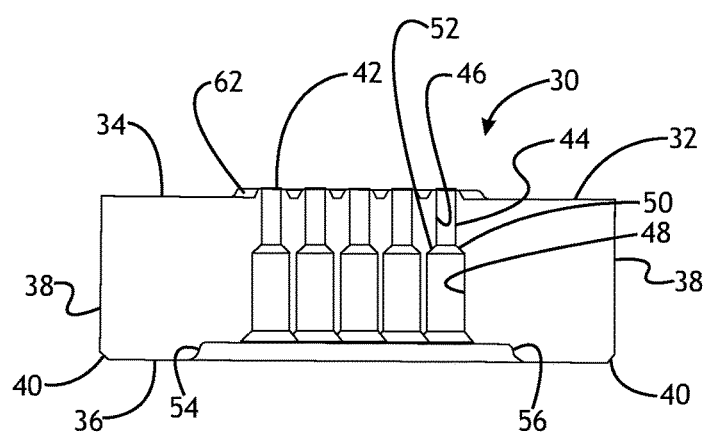
FIG. 3 illustrates a section view of an orifice flow valve according to a number of variations.

Referring to FIGS. 2-5, in a number of variations, an orifice flow valve 30 may comprise a disk body 32 and one or more orifices 42. The disk body 32 may comprise a top surface 34, a bottom surface 36, and a wall 38 which may extend around the disk body 32. In a number of variations, the bottom surface 36 may include a taper 40, for example as illustrated in FIG. 3. In a number of variations, one or more orifices 42 may be located approximately central of the disk body 32 and extend through the top surface 34 and the bottom surface 36.

In a number of variations, an orifice 42 may comprise a linear structure orifice 44. In a number of variations, a linear structure orifice 44 may include a first cylindrical surface 46, a second cylindrical surface 48, and a lip 50 extending therebetween, for example as illustrated in FIGS. 3-5. In a number of variations, the first cylindrical surface 46 may comprise a diameter greater than the diameter of the second cylindrical surface 48. In a number of variations, the lip 50 may form a taper 52 between the first cylindrical surface 46 and the second cylindrical surface 48. The one or more linear structure orifices 44 may be positioned on top of a cylindrical cut out 54, which may comprise curved or rounded edges 56, for example as illustrated in FIG. 3. In another variation, the one or more linear structure orifices 44 may each include a tunnel 58 which may extend into a cylindrical cutout 60 adjacent the bottom surface 36 of the disk body 32 and may be constructed and arranged to direct forward fluid flow through the one or more orifices 44. The cylindrical cutout 60 may be located approximately central of the disk body 32. In a number of variations, the first cylindrical surface 46 of the linear structure orifice 44 may extend a distance past the top surface 34 which may form a protruded circle 62.

Referring to FIGS. 6-9, in a number of variations, the one or more orifices 42 may comprise a funnel structure orifice 64. A funnel structure orifice 64 may comprise a cylindrical surface 66 and a tapered surface 68. In a number of variations, the tapered surface 68 may increase in diameter as it extends toward the bottom surface 36. The cylindrical surface 66 and the tapered surface 68 may extend approximately halfway down from the top surface 34 through the disk body 32. The cylindrical surface 66 may be adjacent the top surface 34. The tapered surface 68 may extend downward from the cylindrical surface 66. The tapered surface 68 may be greater in length than the cylindrical surface 66. In a number of variations, the one or more funnel structure orifices 64 may form a circular shape, for example as illustrated in FIGS. 6 and 7. In a number of variations, the funnel structure orifices 64 may be positioned over a circular cutout 70, for example as illustrated in FIG. 8, which may be constructed and arranged to direct a forward fluid flow through the one or more orifices 64.

Figure 11:
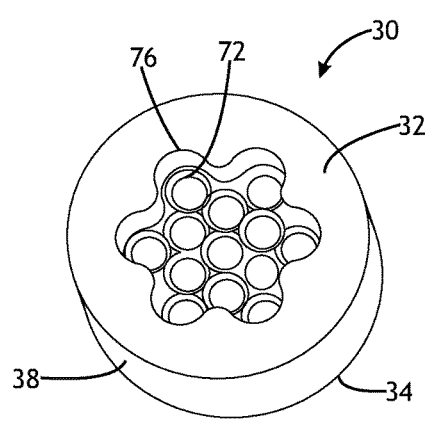
FIG. 11 illustrates a cut view of an orifice flow valve according to a number of variations.
Figure 12:
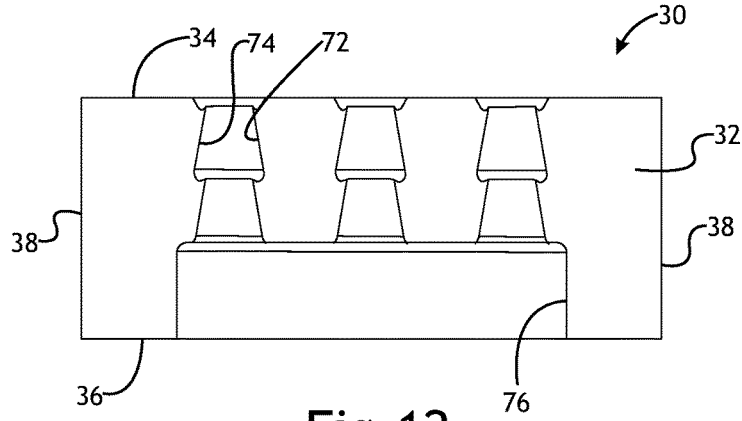
FIG. 12 illustrates a section view of an orifice flow valve according to a number of variations.

Referring to FIGS. 10-13, in a number of variations, the one or more orifices 42 may each comprise a barbed structure orifice 72. In a number of variations, a barbed structure orifice 72 may comprise a plurality of tapered surfaces 74 which may extend at least halfway through the disk body 32. The tapered surfaces 74 may each increase in diameter as they extend downward toward the bottom surface 36. The one or more barbed structure orifices 72 may extend at least halfway through the disk body 32 adjacent the top surface 34. In a number of variations, a cutout 76 in the approximate shape of the one or more barbed structure orifices 72 may be located below the one or more barb structure orifices 72, for example as illustrated in FIGS. 11 and 12, and may be constructed and arranged to direct a forward fluid flow through the one or more orifices 72.

Figure 9:
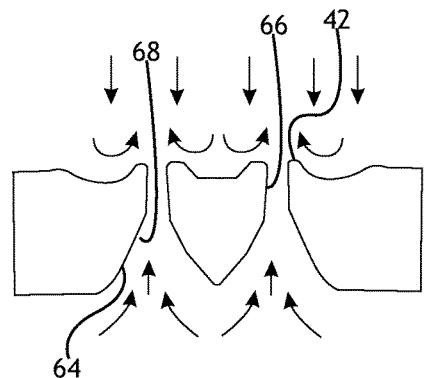
FIG. 9 illustrates a schematic view of an orifice flow valve according to a number of variations.
Figure 10:
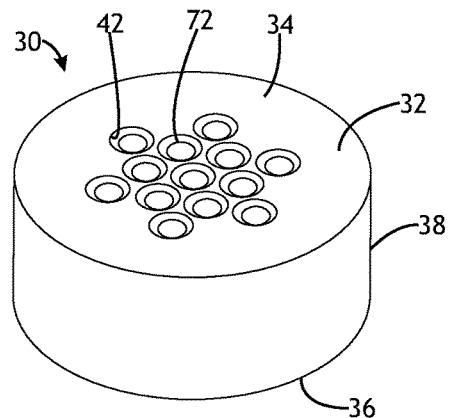
FIG. 10 illustrates a perspective view of an orifice flow valve according to a number of variations.
Figure 13:
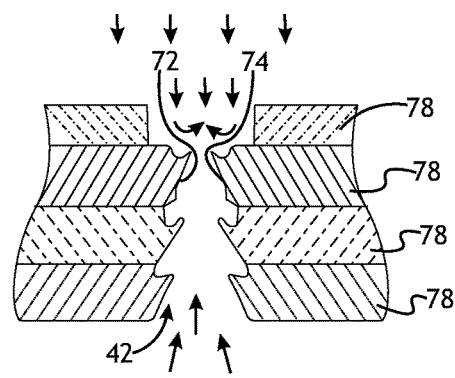
FIG. 13 illustrates a schematic of an orifice flow valve according to a number of variations.

In a number of variations, the at least one orifice 42 may be constructed and arranged so that the forward flow of oil may flow from the reservoir 28 to the tensioner 20 through the bottom surface 36 of the disk body 32 and through the one or more orifices 42 with little to no obstruction. The at least one orifice 42 may also be constructed and arranged so that the backflow of the oil encounters turbulence which may result in flow losses. In other words, the forward flow into the tensioner 20 may be at a greater rate than the backflow into the tensioner's reservoir 28, for example as illustrated in FIGS. 9 and 13.

In any number of variations, the flow path of the orifices 42 may be at one or more angles or inclines, may be curved, or may be any of a number of shapes and may be located at any location in the disk body 32. Further, the number of orifices 42 may be varied depending on design requirements. The dimensions of each orifice 42 may also be varied depending on design requirements.

In any number of variations, the orifice flow valve 30 may be comprised of any number of materials including, but not limited to, plastic, plastic with a hardened metal spring contact surface, or metal. The disk body 32 may comprise one component, for example as illustrated in FIGS. 3 and 12, or may comprises several layers 78, for example as illustrated in FIGS. 4, 5, and 13, which may be attached in any of a number of variations including, but not limited to, interlocking, snapping, or ultrasonically welding the layers together.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an orifice flow valve comprising: a disk, wherein the disk comprises at least one orifice which is constructed and arranged to direct a forward flow of a fluid through the at least one orifice and to impede a backflow of the fluid through the at least one orifice.

Variation 2 may include a product as set forth in Variation 1 wherein a flow rate of the forward flow of the fluid is greater than a flow rate of the backflow of the fluid.

Variation 3 may include a product as set forth in any of Variations 1-2 wherein the at least one orifice is constructed and arranged to create a turbulent flow path for the backflow of fluid and a non-turbulent path for the forward flow of the fluid.

Variation 4 may include a product as set forth in any of Variations 1-3 further comprising a cutout located adjacent a bottom surface of the disk.

Variation 5 may include a product as set forth in any of Variations 1-4 wherein the cutout is constructed and arranged to send the forward flow of fluid through the at least one orifice.

Variation 6 may include a product as set forth in any of Variations 1-5 wherein the at least one orifice comprises a first cylindrical surface, a second cylindrical surface, and a lip extending therebetween, and wherein a first diameter of the first cylindrical surface is less than a second diameter of the second cylindrical surface.

Variation 7 may include a product as set forth in any of Variations 1-6 wherein the at least one orifice comprises a cylindrical surface and a tapered surface, and wherein the diameter of the tapered surface increases as it extends to the bottom surface.

Variation 8 may include a product as set forth in any of Variations 1-7 wherein the at least one orifice comprises a plurality of linear tapered surfaces.

Variation 9 may include a product as set forth in any of Variations 1-8 wherein a bottom surface of the disk comprises a taper.

Variation 10 may include a product as set forth in any of Variations 1-9 wherein the disk is one component.

Variation 11 may include a product as set forth in any of Variations 1-10 wherein the disk comprises several layers.

Variation 12 may include a product as set forth in any of Variations 1-11 wherein the orifice flow valve is attached to a hydraulic tensioner.

Variation 13 may include a product as set forth in any of Variations 1-12 wherein the at least one orifice is linear.

Variation 14 may include a product as set forth in any of Variations 1-13 wherein the at least one orifice is at an incline.

Variation 15 may include a product as set forth in any of Variations 1-14 wherein the at least one orifice is curved.

Variation 16 may include a product as set forth in any of Variations 1-15 further comprising at least one first orifice comprising a first geometry and at least one second orifice comprising a second geometry.

Variation 17 may include a timing chain tensioner hydraulic flow valve comprising: an orifice valve comprising: a valve substrate; wherein the valve substrate comprises at least one orifice; wherein the at least one orifice is constructed and arranged to direct a forward fluid flow through the at least one orifice; and wherein the at least one orifice is constructed and arranged to impede a fluid backflow through the at least one orifice.

Variation 18 may include a timing chain tensioner hydraulic flow valve comprising: an orifice valve comprising: a valve substrate; wherein the valve substrate comprises a plurality of orifices formed therethrough; wherein each of the plurality of orifices has an inlet cross-sectional area greater than an outlet cross-sectional area; wherein each of the plurality of orifices directs a forward fluid flow through the at least one orifice; and wherein each of the plurality of orifices is constructed and arranged to impede a fluid backflow through the at least one orifice.

Variation 19 may include a method comprising: preventing a backflow of fluid into a hydraulic tensioner comprising: providing a valve substrate with at least one orifice, wherein the at least one orifice is constructed and arranged to direct a forward flow of fluid from a tensioner reservoir into the hydraulic tensioner and to impede a backflow of fluid from the tensioner into the reservoir.

Variation 20 may include a product comprising a timing chain tensioner hydraulic flow valve comprising a valve substrate which comprises a means for directing a forward flow of fluid from a tensioner reservoir into a hydraulic tensioner and a means for impeding a backflow of fluid from the tensioner into the reservoir.

The above description of select variations within the scope of the invention is merely illustrative in nature and, thus, variations or variants thereof are not to be regarded as a departure from the spirit and scope of the invention.

What is claimed is:

1. A product comprising:
an orifice flow valve comprising:
a disk body having a top surface, bottom surface, and a wall extending around the disk body, wherein the disk comprises at least one orifice which is constructed and arranged to direct a forward flow of a fluid through the at least one orifice and to impede a backflow of the fluid through the at least one orifice, the at least one orifice extending from the top surface of the disk body to the bottom of the disk body, and wherein the at least one orifice is define by one or more surfaces including a tapered surface, wherein the at least one orifice comprises a plurality of linear tapered surfaces.

2. The product of claim 1 wherein a flow rate of the forward flow of the fluid is greater than a flow rate of the backflow of the fluid.

3. The product of claim 1 wherein the at least one orifice is constructed and arranged to create a turbulent flow path for the backflow of fluid and a non-turbulent path for the forward flow of the fluid.

4. The product of claim 1 further comprising a cutout located adjacent a bottom surface of the disk.

5. The product of claim 4 wherein the cutout is constructed and arranged to send the forward flow of fluid through the at least one orifice.

6. A product as set forth in claim 1 wherein the at least one orifice comprises a first cylindrical surface, a second cylindrical surface, and a lip extending therebetween, and wherein a first diameter of the first cylindrical surface is less than a second diameter of the second cylindrical surface.

7. A product as set forth in claim 1 wherein the at least one orifice comprises a cylindrical surface and a tapered surface, and wherein the diameter of the tapered surface increases as it extends to the bottom surface.

8. A product as set forth in claim 1 wherein a bottom surface of the disk comprises a taper.

9. The product of claim 1 wherein the disk is one component.

10. The product of claim 1 wherein the orifice flow valve is attached to a hydraulic tensioner.

11. A product as set forth in claim 1 wherein the at least one orifice is linear.

12. A product as set forth in claim 1 wherein the at least one orifice is at an incline.

13. A product as set forth in claim 1 wherein the at least one orifice is curved.

14. A product as set forth in claim 1 further comprising at least one first orifice comprising a first geometry and at least one second orifice comprising a second geometry.

15. A product comprising:
an orifice flow valve comprising:
a disk body having a top surface, bottom surface, and a wall extending around the disk body, wherein the disk comprises at least one orifice which is constructed and arranged to direct a forward flow of a fluid through the at least one orifice and to impede a backflow of the fluid through the at least one orifice, the at least one orifice extending from the top surface of the disk body to the bottom of the disk body, and wherein the at least one orifice is define by one or more surfaces including a tapered surface wherein the disk comprises several layers.

16. A timing chain tensioner hydraulic flow valve comprising:
an orifice valve comprising:
a valve substrate;
wherein the valve substrate comprises at least one orifice;
wherein the at least one orifice is constructed and arranged to direct a forward fluid flow through the at least one orifice; and
wherein the at least one orifice is constructed and arranged to impede a fluid backflow through the at least one orifice, the at least one orifice extending through the valve substrate, and wherein the at least one orifice comprises a plurality of linear tapered surfaces.

17. A timing chain tensioner hydraulic flow valve comprising:
an orifice valve comprising:
a valve substrate;
wherein the valve substrate comprises a plurality of orifices formed therethrough;
wherein each of the plurality of orifices has an inlet cross-sectional area greater than an outlet cross-sectional area;
wherein each of the plurality of orifices directs a forward fluid flow through the plurality of orifices; and
wherein each of the plurality of orifices is constructed and arranged to impede a fluid backflow through the at least one orifice, wherein each one of the plurality of orifices extends through the valve substrate, and wherein each of the plurality of orifices is defined by one or more surfaces including a tapered surface.

18. A method comprising:
preventing a backflow of fluid into a hydraulic tensioner comprising:
providing a valve substrate comprising a plurality of orifices, wherein each one of the plurality of orifices is constructed and arranged to direct a forward flow of fluid from a tensioner reservoir into the hydraulic tensioner and to impede a backflow of fluid from the tensioner into the reservoir, each one of the plurality of orifices extending through the valve substrate, and wherein each one of the plurality of orifices is define by one or more surfaces including a tapered surface.

19. A product comprising a timing chain tensioner hydraulic flow valve comprising a valve substrate which comprises a means for directing a forward flow of fluid from a tensioner reservoir into a hydraulic tensioner and a means for impeding a backflow of fluid from the tensioner into the reservoir, and at least one orifice extending through the valve substrate, and wherein the at least one orifice is define by one or more surfaces including a tapered surface, wherein the at least one orifice comprises a plurality of orifices.

* * * * *